United States Patent
Tsuji

(10) Patent No.: US 8,885,196 B2
(45) Date of Patent: Nov. 11, 2014

(54) PORTABLE TERMINAL, PRINTING SYSTEM, CONTROL METHOD FOR PORTABLE TERMINAL, AND COMPUTER PROGRAM PRODUCT FOR EXECUTING PRINTING BASED ON MOVEMENT OF THE PORTABLE TERMINAL

(75) Inventor: Akinori Tsuji, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 138 days.

(21) Appl. No.: 13/529,099

(22) Filed: Jun. 21, 2012

(65) Prior Publication Data
US 2013/0003122 A1 Jan. 3, 2013

(30) Foreign Application Priority Data

Jul. 1, 2011 (JP) ................. 2011-147116

(51) Int. Cl.
*G06K 15/02* (2006.01)
*G06F 3/12* (2006.01)

(52) U.S. Cl.
CPC ............ *G06F 3/1204* (2013.01); *G06F 3/1292* (2013.01); *G06F 3/1253* (2013.01)
USPC ............................ 358/1.15; 358/1.1; 358/1.14

(58) Field of Classification Search
CPC . H04N 1/00; H04N 1/00095; H04N 1/00103; H04N 1/00108; H04N 1/00912; H04M 2250/12; H04M 2250/52; G06F 1/1694; G06F 3/0173; G06F 3/1292
USPC ........ 358/1.1, 1.15, 400, 401, 442, 1.13, 1.14
See application file for complete search history.

(56) References Cited

U.S. PATENT DOCUMENTS

| 6,067,171 | A | * | 5/2000 | Yamada et al. | ................ 358/406 |
| 8,085,413 | B2 | * | 12/2011 | Yamada et al. | ............... 358/1.13 |
| 8,170,478 | B2 | * | 5/2012 | Mizoguchi | .................... 455/41.1 |
| 8,185,164 | B2 | * | 5/2012 | Kim | .............................. 455/566 |
| 8,502,875 | B2 | * | 8/2013 | Matsuda et al. | ............ 348/207.2 |
| 2007/0146474 | A1 | | 6/2007 | Kameda et al. | |
| 2010/0281394 | A1 | | 11/2010 | Gopi et al. | |
| 2011/0075166 | A1 | | 3/2011 | Goldwater et al. | |
| 2011/0075200 | A1 | | 3/2011 | Goldwater et al. | |

FOREIGN PATENT DOCUMENTS

JP 2007-176042 A 7/2007
WO WO-2009072738 6/2009

OTHER PUBLICATIONS

European Search Report, Sep. 25, 2013, issued in related Patent Application No. EP-12172792.

* cited by examiner

*Primary Examiner* — Thomas D Lee
(74) *Attorney, Agent, or Firm* — ALG Intellectual Property, LLC

(57) ABSTRACT

A portable terminal for transmitting printing data to a printing apparatus, the portable terminal including: a printing-data generating unit for generating the printing data; a detecting unit for detecting movement of a main body of the portable terminal; and a printing-data transmitting unit for transmitting the printing data to the printing apparatus when movement is detected by the detecting unit in a printing instruction waiting state after the printing data generation.

9 Claims, 5 Drawing Sheets

PORTABLE TERMINAL, PRINTING SYSTEM, CONTROL METHOD FOR PORTABLE TERMINAL, AND COMPUTER PROGRAM PRODUCT FOR EXECUTING PRINTING BASED ON MOVEMENT OF THE PORTABLE TERMINAL

CROSS-REFERENCE

The entire disclosure of Japanese Patent Application No. 2011-147116 filed on Jul. 1, 2011, which is hereby incorporated by reference in its entirety.

BACKGROUND

In a label printing system including a portable terminal and a label printing apparatus (a printing apparatus), there is known a method in which, after creating printing data in the portable terminal, a user gives a printing instruction to the label printing apparatus using an operation unit to thereby cause the portable terminal to transmit the printing data to the label printing apparatus (e.g., Japanese Patent Publication No. 2007-176042). As a printing instruction method, for example, depression of a printing execution button provided in the portable terminal is conceivable.

Various operators of the portable terminal are small and difficult to handle because of characteristics of the portable terminal. In recent years, a large number of smart phones in which substantially the entire surface of the front surface of an apparatus housing is configured by a touch panel are put on the market. However, since it is necessary to display an editing screen and display various operators (icons) in a screen of the touch panel, the operators still tend to be difficult to handle. In particular, in the case of a male user, when the user attempts to touch a small icon with the fingertip, an operation mistake is often caused. Therefore, it is demanded that important operation (e.g., operation that cannot be corrected once performed such as a printing instruction) can be easily executed without using the small operators.

SUMMARY

Various embodiments may provide a portable terminal, a printing system, a control method for the portable terminal, and a computer program product that can easily give a printing instruction to a printing apparatus.

At least one embodiment of the disclosure, there is provided a printing system including a portable terminal and a printing apparatus. The portable terminal includes: a printing-data generating unit that generates printing data; a detecting unit that detects the movement of a main body of the portable terminal; and a printing-data transmitting unit that transmits the printing data to the printing apparatus. The printing-data transmitting unit transmits the printing data when predetermined movement is detected by the detecting unit in a printing instruction waiting state after the printing data generation.

At least one embodiment of the disclosure, there is provided a control method for a printing system including a portable terminal and a printing apparatus. The control method includes: allowing the portable terminal to execute generation of printing data; detection of the movement of a main body of the portable terminal; and transmission of the printing data to the printing apparatus. In the transmission of the printing data, the portable terminal transmits the printing data when predetermined movement is detected in the detection of movement in a printing instruction waiting state after the generation of printing data.

With these configurations, a user can give a printing instruction to the printing apparatus by giving the predetermined movement to the portable terminal. In other words, the user can give a printing instruction to the printing apparatus without using small operators. Therefore, it is possible to prevent an operation mistake. The printing data is transmitted only in the printing instruction waiting state after the printing data generation. Therefore, the user does not give the predetermined movement to the portable terminal against the user's will and cause the printing apparatus to execute printing.

As the "predetermined movement", it is conceivable to, for example, apply acceleration equal to or larger than a predetermined value to the portable terminal, give vibration to the portable terminal, rotate the portable terminal an angle equal to or larger than a predetermined angle, or move the portable terminal in a predetermined direction.

"After the printing data generation" indicates a state in which the printing data is decided. In other words, "after the printing data generation" indicates a state in which the printing data can be transmitted only if a printing instruction is given. Even a state in which no information is input may be treated as "after the printing data generation" on the assumption that printing data of "nothing" is generated.

The printing system may be configured such that the portable terminal further includes a display unit that displays a preview display screen for the printing data. The printing-data transmitting unit transmits the printing data when the predetermined movement is detected by the detecting unit in a state in which the preview display screen is displayed.

The printing system may be configured such that the display unit displays an editing screen for editing the printing data. The printing-data transmitting unit does not transmit the printing data when the predetermined movement is detected by the detecting unit in a state in which the editing screen is displayed.

With these configurations, the user only has to give the predetermined movement to the portable terminal in the state in which the preview display screen is displayed. Therefore, the user can easily understand an operation method. In the state in which the editing screen is displayed, the printing data is often being edited. Therefore, it is possible to prevent an operation mistake by not transmitting the printing data according to the detection of the predetermined movement.

The printing system may be configured such that the printing system further includes a display control unit that switches the editing screen to the preview display screen when the predetermined movement is detected by the detecting unit in the state in which the editing screen is displayed.

With this configuration, the user can give a printing instruction to the printing apparatus by giving the predetermined movement to the portable terminal twice in the state in which the editing screen is displayed. In other words, the user can easily and quickly perform screen switching operation and printing instruction operation.

The printing system may be configured such that the portable terminal further includes a printing-stop requesting unit that transmits a printing stop command to the printing apparatus when the predetermined movement is detected by the detecting unit within a predetermined time after the transmission of the printing data.

With this configuration, for example, when the user gives a printing instruction to the printing apparatus by mistake or when the user notices an error of the printing data after giving a printing instruction to the printing apparatus, the user can stop printing. The user can easily perform printing stop instruction operation.

The printing system may be configured such that the printing apparatus includes a printing control unit that stops printing when the printing data is acquired again during the execution of the printing.

With this configuration, for example, when the user gives a printing instruction to the printing apparatus by mistake or when the user notices an error of the printing data after giving a printing instruction to the printing apparatus, the user can stop printing by giving the predetermined movement to the portable terminal again.

The printing system may be configured such that the printing apparatus determines the number of printed sheets according to the number of times of acquisition of the printing data during printing standby and performs printing for the number of printed sheets.

With this configuration, the user can designate the number of printed sheets according to the number of times the user gives the predetermined movement to the portable terminal.

A printing medium of the printing apparatus may be a sheet (a strip-like medium) of a predetermined size such as a copy sheet or may be an elongated medium cut to predetermined length and used such as a printing tape. In the latter case, processing for cutting the elongated medium is performed the number of times equivalent to the designated number of printed sheets.

The printing system may be configured such that the detecting unit detects the predetermined movement on the basis of a detection result of at least one of an acceleration sensor and an angular velocity sensor.

With this configuration, it is possible to reduce costs for the detecting unit by using the acceleration sensor or the angular velocity sensor often mounted on portable terminals such as a cellar phone and a smart phone.

At least one embodiment of the disclosure, there is provided a portable terminal used in the printing system.

At least one embodiment of the disclosure, there is provided a computer program product embodied in at least one non-transitory computer readable medium and comprising computer instructions executable by a computer and causing a computer to execute the control method for the printing system, the computer program comprising: generating printing data; detecting the movement of a main body of a portable terminal; and transmitting the printing data to a printing apparatus when predetermined movement is detected in the detecting the movement in a printing instruction waiting state after the printing data generation.

By using the portable terminal and the computer program, it is possible to realize a printing system and a control method for the printing system that can easily give a printing instruction to a printing apparatus.

BRIEF DESCRIPTION OF THE DRAWINGS

The invention will be described with reference to the accompanying drawings, wherein like reference numbers reference like elements.

DESCRIPTION OF EXEMPLARY EMBODIMENTS

Exemplary embodiments of the invention are explained in detail below with reference to the accompanying drawings. In an example explained below, a tape printing apparatus that performs printing on a tape-like member and cuts a printed portion to thereby create a label is used as a printing apparatus.

Figure 1:
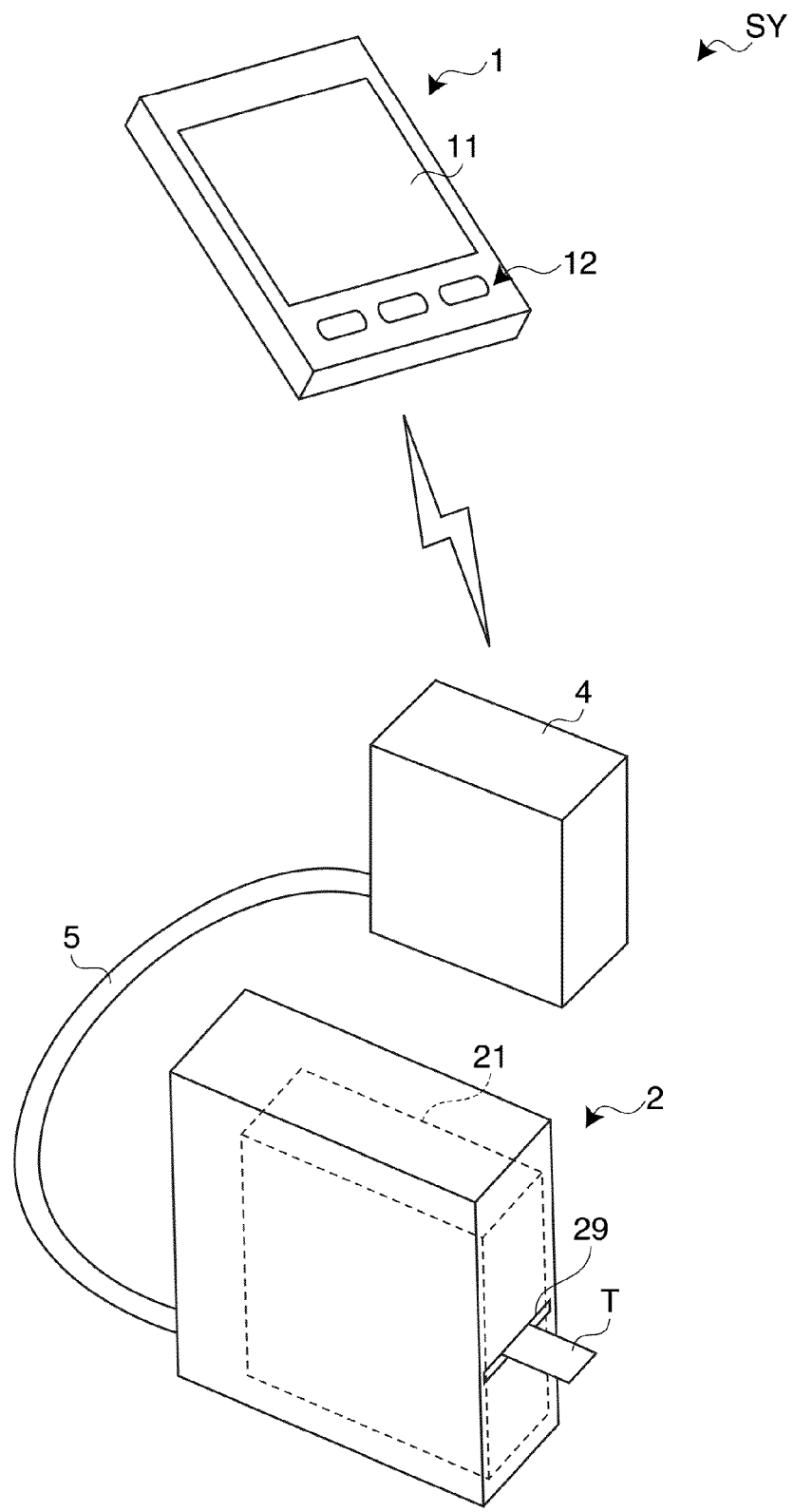
FIG. 1 is a system configuration diagram of a printing system according to an embodiment of the invention.

FIG. 1 is a system configuration diagram of a printing system SY according to an embodiment of the invention. As shown in the figure, the printing system SY includes a portable terminal 1, which is an information terminal of a portable type, a tape printing apparatus 2 that performs printing on the basis of printing data created by the portable terminal 1, and a wireless LAN (Local Area Network) router 4 that functions as a print server. The portable terminal 1 and the wireless LAN router 4 are connected via a wireless LAN. The wireless LAN router 4 and the tape printing apparatus 2 are connected via a cable 5.

The portable terminal 1 is a general smart phone including a touch panel 11 and operators 12. The operators 12 are physical operators (different from a button group displayed on the touch panel 11). Specific functions such as a power ON/OFF function and an application end function are allocated to the operators 12. As the portable terminal 1, a small information terminal such as a PDA or a cellular phone may be adopted instead of the smart phone.

The tape printing apparatus 2 is mounted with a tape cartridge 21 in which an elongated printing tape T and an ink ribbon are stored. The tape printing apparatus 2 performs printing processing and cutting processing on the basis of printing data received from the portable terminal 1 while letting out the printing tape T from the tape cartridge 21. After the cutting processing, a printed portion of the printing tape T is discharged from a tape discharge port 29 and used as a label.

Figure 2:
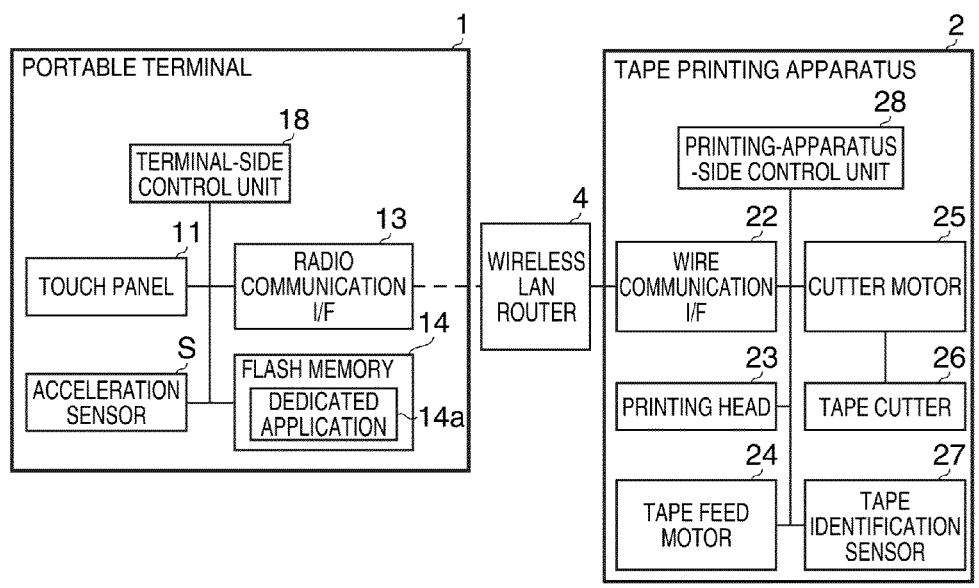
FIG. 2 is a control block diagram of the printing system.

A control configuration of the printing system SY is explained with reference to FIG. 2. The portable terminal 1 includes a touch panel 11 (a display unit), an acceleration sensor S (a detecting unit), a radio communication interface 13, a flash memory 14, and a terminal-side control unit 18 (a printing-data generating unit).

The touch panel 11 functions as display means and operation means. In this embodiment, the touch panel 11 is mainly used for display of an editing screen D1 (see FIG. 3) and a preview display screen D2 (see FIG. 4) and operation of groups of various operators displayed on both the screens.

The acceleration sensor S is used to detect the movement of a main body of the portable terminal 1. In this embodiment, the acceleration sensor S is used to detect vibration (a shaking action by a user) of the terminal main body to perform screen transition and transmit printing data (a printing request) and a printing stop request to the tape printing apparatus 2. A gyroscope (an angular velocity sensor) may be used instead of the acceleration sensor S. A sensor that can detect vibration, impact, or a position can also be used. Alternatively, the gyroscope (the angular velocity sensor) may be used in addition to the acceleration sensor S. It is possible to more accurately detect the movement of the terminal main body by combining the acceleration sensor S and the gyroscope.

The radio communication interface 13 performs communication with the wireless LAN router 4. The radio communication interface 13 is used for transmission of the printing data and the printing stop request (a printing-data transmitting unit and a printing-stop requesting unit). The flash memory 14 is used as a main memory of the portable terminal 1 and has stored therein a dedicated application 14a. The dedicated application 14a is an application for realizing a series of printing processing explained below with reference to FIG. 5 and the like and is downloaded from a predetermined server (a Web site).

The terminal-side control unit 18 includes a CPU (Central Processing Unit), a ROM (Read Only Memory), and a RAM (Random Access Memory). The terminal-side control unit 18 controls various kinds of processing such as printing data generation processing based on the dedicated application 14*a*, vibration detection processing performed using the acceleration sensor S, communication processing with the tape printing apparatus 2, and display control processing for the touch panel 11.

On the other hand, the tape printing apparatus 2 includes a wire communication interface 22, a printing head 23, a tape feed motor 24, a cutter motor 25, a tape cutter 26, a tape identification sensor 27, and a printing-apparatus-side control unit 28 (a printing control unit).

The wire communication interface 22 includes a USB interface and used for, for example, transmission of status information. The printing head 23 is a thermal head. The printing head 23 holds the let-out printing tape T and ink ribbon between the printing head 23 and a platen roller (not shown in the figure) and performs printing. The tape feed motor 24 conveys the printing tape T, which is let out from a tape reel, from the printing head 23 to the tape discharge port 29. The cutter motor 25 drives the tape cutter 26 and cuts a printed portion of the printing tape T in the tape width direction in a state in which the tape feed is once stopped.

The tape identification sensor 27 is provided in a cartridge inserting section into which the tape cartridge 21 is inserted. The tape identification sensor 27 detects the type of the printing tape T on the basis of presence or absence of plural detection holes formed in the tape cartridge 21. Information concerning the detected tape type (information concerning tape width, a tape material, and the like) is transmitted to the portable terminal 1 as a part of the status information.

The printing-apparatus-side control unit 28 includes a CPU, a ROM, and a RAM and performs overall control for the tape printing apparatus 2. The ROM has stored therein control programs and control information for the CPU to perform various kinds of control. As the control programs, the ROM has stored therein, for example, a command analysis program for analyzing various commands transmitted from the portable terminal 1 and a printing/cutting processing program for performing the printing processing and the cutting processing.

Figure 3:
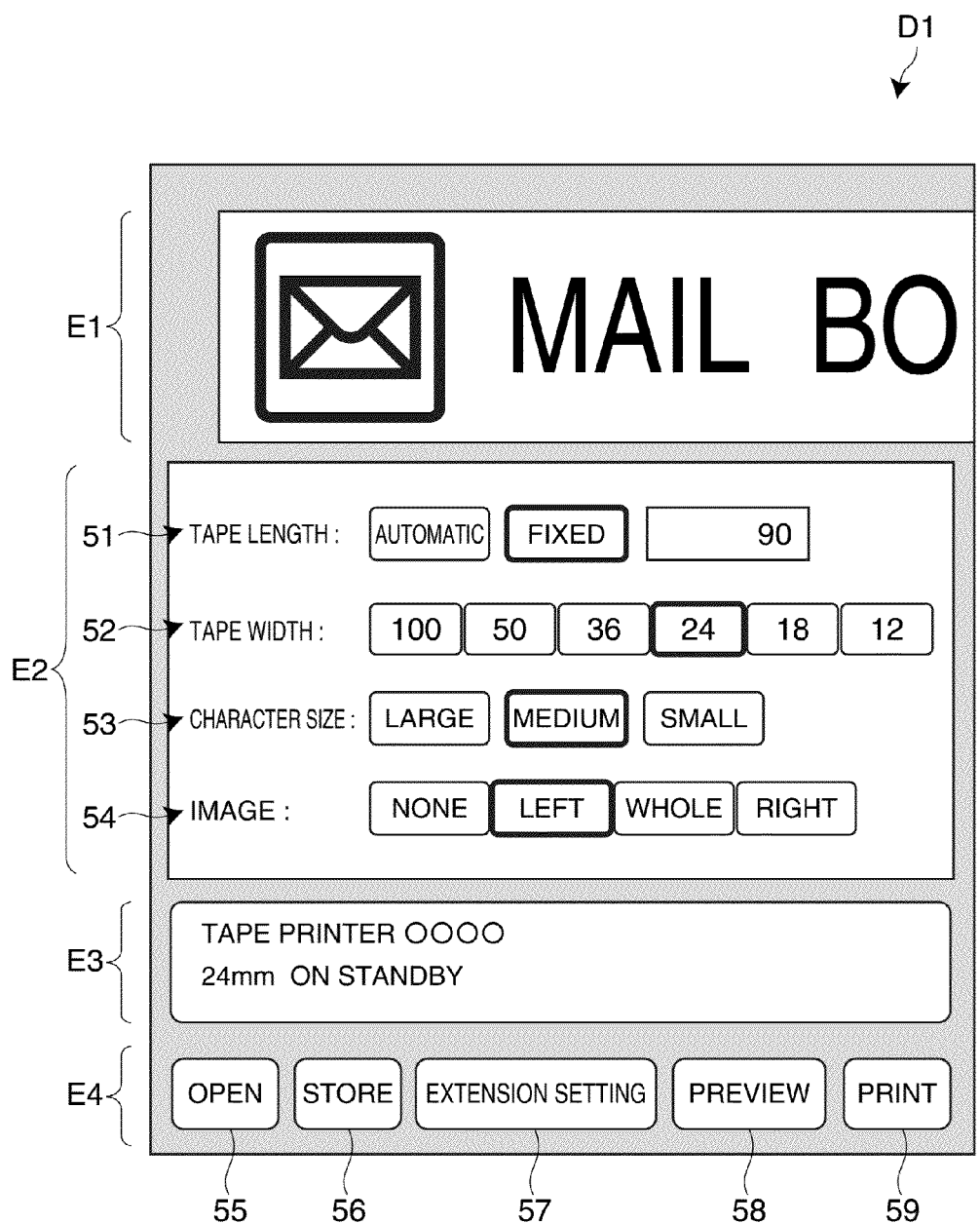
FIG. 3 is a diagram showing a display example of an editing screen.

Screen configurations of the editing screen D1 and the preview display screen D2 are explained with reference to FIGS. 3 and 4. As shown in FIG. 3, the editing screen D1 includes an editing result display area E1, a menu display area E2, a status display area E3, and an operation button display area E4.

In the editing result display area E1, printing data being edited is displayed to be superimposed on a tape image, which is an image of the printing tape T. Scroll display in the tape length direction can be performed by flip operation (operation for flipping the touch panel 11 with a finger). In the editing result display area E1, a relative size of an image (e.g., a mail image shown in the figure) and characters (a text) with respect to the printing tape T is displayed substantially the same as the size of a label to be actually printed. However, the width of the tape image is not changed according to tape width set by the portable terminal 1 or the tape width of the printing tape T actually inserted in the tape printing apparatus 2. In other words, the tape width of the tape image displayed in the editing result display area E1 is fixed length.

The menu display area E2 includes a tape length setting menu 51, a tape width setting menu 52, a character size setting menu 53, and an image setting menu 54. The tape length setting menu 51 includes an automatic setting button for automatically setting, according to printing data, the tape length of a label to be created, a fixed setting button for the user to manually set the tape length of a label to be created, and a text box in which the user inputs tape length in the manual setting. When the user desires to manually set tape length, the user selects the fixed setting button and thereafter inputs the tape length in the text box as a numerical value in a millimeter unit. When the tape length is manually set, the portable terminal 1 (the dedicated application 14*a*) edits printing data to obtain the set tape length.

In the tape width setting menu 52, the tape width of the printing tape T can be selected out of "100 mm", "50 mm", "36 mm", "24 mm", "18 mm", and "12 mm". When the tape width of the printing tape T actually inserted in the tape printing apparatus 2 and the tape width set in the tape width setting menu 52 are different, a popup screen is displayed during a printing instruction (during selecting of a "print button" 59 explained below or during vibration detection in a display state of the preview display screen D2). Although not specifically shown in the figure, three options "adjust tape width and print", "replace a tape and print", and "cancel" are displayed on the popup screen. When the "adjust tape width and print" is selected, the portable terminal 1 edits printing data (performs expansion/reduction processing) according to the tape width of the printing tape T inserted in the tape printing apparatus 2 and transmits the printing data to the tape printing apparatus 2. When the "replace a tape and print" is selected, the portable terminal 1 detects the replacement of the tape cartridge 21 of the tape printing apparatus 2. When the portable terminal 1 determines that the tape width of the inserted printing tape T and the set tape width coincide with each other, the portable terminal 1 transmits the printing data to the tape printing apparatus 2. When the "cancel" is selected, the portable terminal 1 hides the popup screen.

In the character size setting menu 53, a character size of characters (a text) can be selected out of "large", "medium", and "small". "Large", "medium", and "small" are relative sizes with respect to the printing tape T and, therefore, do not designate absolute font sizes.

In the image setting menu 54, an insertion position of an image (image data) can be selected out of "none", "left", "whole", and "right". When the "left" is selected, the portable terminal 1 arranges the image to the left with respect to a label (arranges the image on the tape front end side). When the "right" is selected, the portable terminal 1 arranges the image to the right with respect to the label (arranges the image on the tape rear end side). Further, when the "whole" is selected, the portable terminal 1 expands the image in the tape width direction and arranges the image over the whole label.

In the status display area E3, status information of the tape printing apparatus 2 is displayed. The terminal apparatus 1 according to this embodiment periodically transmits a status transmission request to the tape printing apparatus 2. The tape printing apparatus 2 returns status information in response to the status transmission request. As the status information, a model name of the tape printing apparatus 2, tape width, and information indicating a state of the tape printing apparatus 2 (including various kinds of error information) are displayed. The tape width is information based on a detection result of the tape identification sensor 27 (see FIG. 2).

The operation button display area E4 includes an "open" button 55, a "store" button 56, an "extension setting" button 57, a "preview" button 58, and a "print" button 59. When the "open" button 55 is selected, the portable terminal 1 opens a printing data file stored in advance. When the "store" button 56 is selected, the portable terminal 1 stores generated printing data as a printing data file. When the "extension setting"

button 57 is selected, the portable terminal 1 displays an extension setting screen. Although not specifically shown in the figure, an image selection button and a QR code (Quick-Response code) creation button are displayed on the extension setting screen. When the image selection button is selected, the portable terminal 1 displays an image selection screen for selecting a desired image out of an image list. When the QR code creation button is selected, the portable terminal 1 displays a QR code creation screen for creating a QR code (or another type of a one-dimensional or two-dimensional code image).

Figure 4:
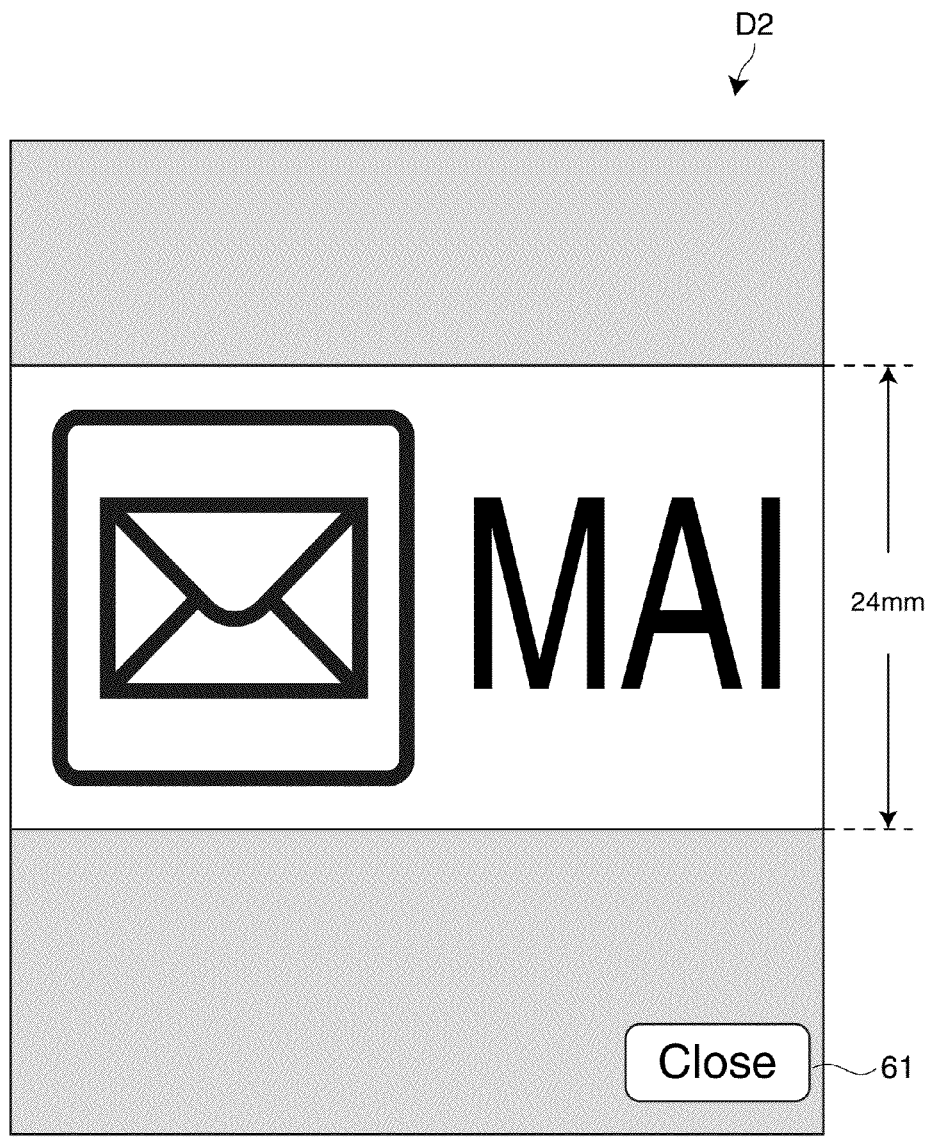
FIG. 4 is a diagram showing a display example of a preview display screen.

On the other hand, when the "preview" button 58 is selected from the operation button display area E4, the portable terminal 1 displays the preview display screen D2 (see FIG. 4). When the "print" button 59 is selected, the portable terminal 1 transmits printing data to the tape printing apparatus 2. The "print" button 59 can be selected only in a state in which the printing data is decided. The printing data can also be transmitted by giving vibration to the main body of the portable terminal 1 in a state in which the preview display screen D2 is displayed instead of selecting the "print" button 59. However, in a state in which the editing screen D1 is displayed, the printing data is not transmitted even if vibration is given to the main body of the portable terminal 1. The editing screen D1 is switched to the preview display screen D2.

FIG. 4 is a diagram showing a display example of the preview display screen D2. The portable terminal 1 performs preview display on the preview display screen D2 in a full scale according to tape width set in the tape width setting menu 52. In the example shown in the figure, since the tape width is set to 24 mm, the width of a tape image of the preview display is also 24 mm. Since the preview display is performed in a full screen in this way, the user can place the touch panel 11 of the portable terminal 1 in a place where a label is actually stuck and check a label sticking image. On the preview display screen D2, scroll display in the two-dimensional direction can be performed according to flip operation by the user. When a close button 61 displayed at the lower right of the preview display screen D2 is selected, the preview display screen D2 returns to the editing screen D1.

Figure 5:
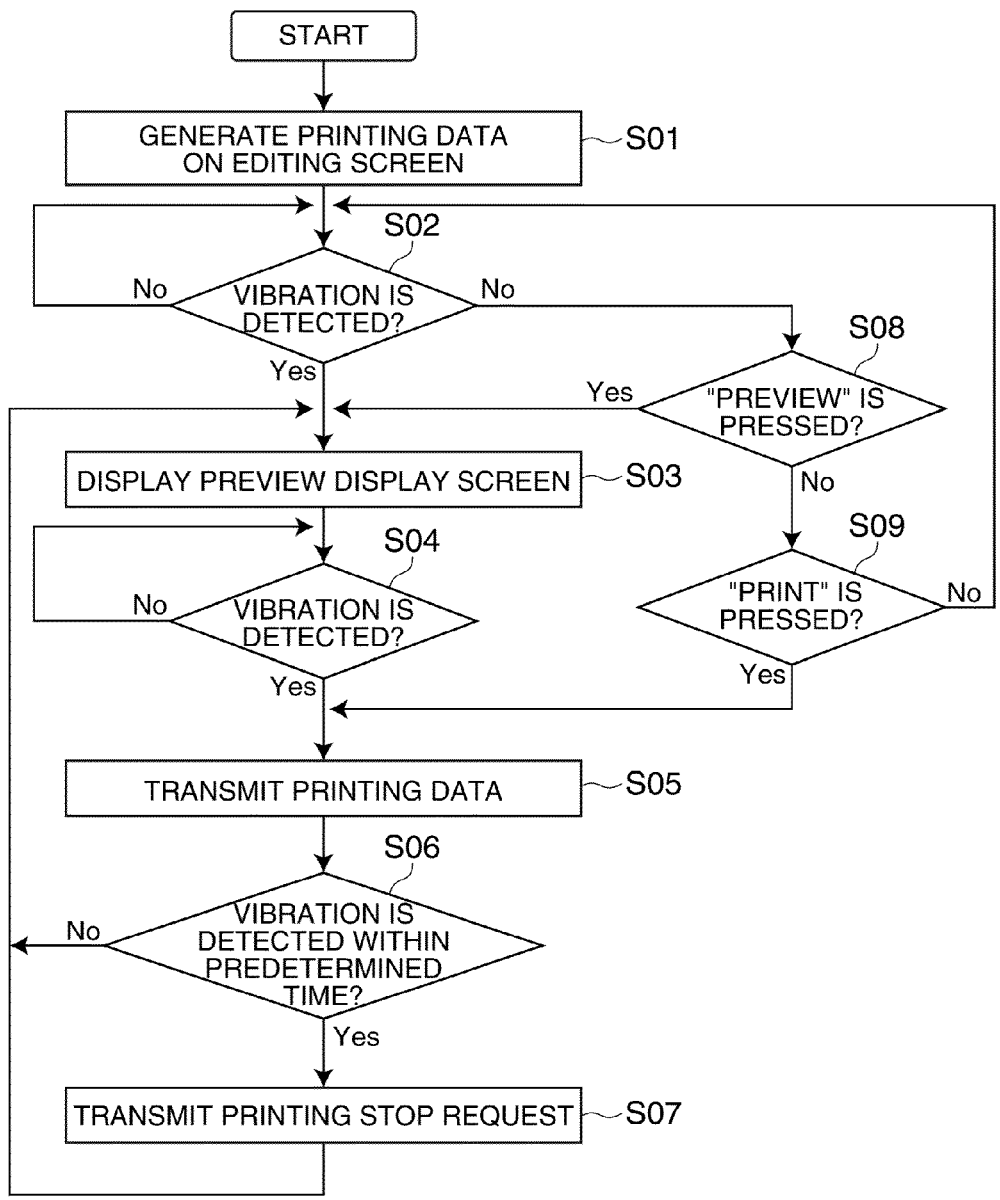
FIG. 5 is a flowchart showing a flow of printing processing.

A flow of printing processing is explained with reference to a flowchart of FIG. 5. The portable terminal 1 (the dedicated application 14*a*) generates printing data on the editing screen D1 (S01). Then, when the portable terminal 1 detects vibration with the acceleration sensor S (Yes in S02), the portable terminal 1 displays the preview display screen D2 (S03). When the portable terminal 1 detects vibration in the state in which the preview display screen D2 is displayed (Yes in S04), the portable terminal 1 transmits the printing data to the tape printing apparatus 2 (S05). Further, when the portable terminal 1 detects vibration within a predetermined time (e.g., about several seconds) after the transmission of the printing data (Yes in S06), the portable terminal 1 transmits a printing stop request to the tape printing apparatus 2 (S07) and returns to S03. When the tape printing apparatus 2 receives the printing stop request, the tape printing apparatus 2 stops the printing processing at the point of the reception. When the portable terminal 1 does not detect vibration within the predetermined time after the transmission of the printing data (No in S06), the portable terminal 1 omits S07 and returns to S03.

On the other hand, in the case of No in S02 and when the "preview" button 58 is selected on the editing screen D1 (Yes in S08), as in the case of Yes in S02, the portable terminal 1 displays the preview display screen D2 (S03). In the case of No in S08 and when the "print" button 59 is selected on the editing screen D1 (Yes in S09), as in the case of Yes in S04, the portable terminal 1 transmits the printing data (S05).

The "predetermined time" set as a discrimination reference in S06 of the flowchart may be changed according to the printing data. For example, when a data amount of the printing data is large, the predetermined time may be set long. When the data amount is small, the predetermined time may be set short. The "predetermined time" may be changed according to tape length or the number of characters instead of the data amount.

S06 and S07 may be omitted from the flowchart. With this configuration, every time vibration is given (Yes in S04), the printing data is transmitted (S05). Therefore, printing of plural labels based on the same printing data can be easily performed. When the printing of plural labels is performed, the tape printing apparatus 2 repeats printing of the printing data and tape cut plural times.

As explained above, according to this embodiment, the user can easily give a printing instruction to the tape printing apparatus 2 simply by giving vibration to the portable terminal 1. In the state in which the editing screen D1 is displayed, editing is often being performed. Therefore, it is possible to prevent an operation mistake by performing screen switching to the preview display screen D2 without transmitting the printing data according to the detection of vibration. Further, since the screen switching and the transmission of the printing data are performed on the basis of the detection of the same movement, the user can easily understand an operation method. In other words, the user can easily and quickly give the printing instruction to the tape printing apparatus 2 by giving vibration to the portable terminal 1 twice in the state in which the editing screen D1 is displayed.

When the portable terminal 1 detects vibration within the predetermined time after the transmission of the printing data, the portable terminal 1 transmits the printing stop request. Therefore, for example, when the user gives a printing instruction by mistake or when the user notices an error of the printing data after the printing instruction, the user can immediately stop printing.

A modification explained below may be adopted. For example, instead of the transmission of the printing stop request from the portable terminal 1, the tape printing apparatus 2 may discriminate a printing stop. For example, when the tape printing apparatus 2 acquires the printing data again during the execution of printing, the tape printing apparatus 2 may regard the acquisition of the printing data as the printing stop request and stop the printing (the printing control unit). With this configuration, for example, when the user gives a printing instruction to the portable terminal 1 by mistake or when the user notices an error of the printing data after the printing instruction, the user can stop the printing by giving vibration to the portable terminal 1 again. The operation by the user for transmitting the printing stop request is the same as the operation in the embodiment explained above. However, this modification is different from the embodiment in that the tape printing apparatus 2 discriminates whether the same command transmitted from the portable terminal 1 is treated as the printing request (a printing command for the printing data) or treated as the printing stop request. In the application of this modification, the tape printing apparatus 2 desirably secures a predetermined wait time from the reception of the printing data until the start of the printing. With this configuration, when the user makes an operation mistake, if the user gives vibration within a wait time, the user can stop the printing before the start of the printing. Therefore, it is possible to reduce a waste of the printing tape T.

As another modification, the tape printing apparatus 2 may determine the number of printed sheets according to the number of times of acquisition of the printing data during the printing standby and perform printing for the number of printed sheets (the printing control unit). With this configuration, the user can designate the number of printed sheets according to the number of times the user gives the predetermined movement to the portable terminal 1. In this modification, as in the embodiment, it is desirable to secure the predetermined wait time from the reception of the printing data until the start of the printing. With this configuration, the user only has to give vibration to the portable terminal 1 the number of times equivalent to a desired number of printed sheets within the wait time. Therefore, the latitude of designation of the number of printed sheets increases.

In this case, the portable terminal 1 may transmit, according to the number of times of continuous detection of vibration (the predetermined movement), printing data for one sheet and number-of-sheets information indicating the number of printed sheets corresponding to the number of times of continuous detection. In this case, when the portable terminal 1 detects the next vibration within a predetermined time (e.g., one second) after the detection of vibration, the portable terminal 1 discriminates that a continuous shake (a number-of-sheets designating operation) is performed and specifies the number of times of continuous detection. At a point when the continuous shake ends, the portable terminal transmits the printing data for one sheet and the number-of-sheets information. On the other hand, the tape printing apparatus 2 copies the printing data by the designated number of sheets and prints plural sheets according to the received number-of-sheets information. With this configuration, when the plural sheets are printed, it is possible to reduce a transmission amount of data transmitted from the portable terminal 1 to the tape printing apparatus 2.

In the embodiment explained above, when vibration is detected in the state in which the preview display screen D2 is displayed, the printing data is transmitted. However, even in the state in which the editing screen D1 is displayed, if the generation of the printing data is completed (if the printing data is decided), the printing data may be transmitted according to the detection of vibration.

The screen transition and the transmission of the printing data and the printing stop request may be performed by detecting an amount of other movement given to the terminal main body such as application of acceleration equal to or larger than a predetermined value, rotation at an angle equal to or larger than a predetermined angle, or movement in a predetermined direction rather than giving vibration to the portable terminal 1.

Different printing control may be performed according to the type of the predetermined movement given to the portable terminal 1 and the size of movement. For example, it is conceivable to change automatic cut and manual cut according to the size of movement and change normal printing and mirror surface printing according to the type of movement. In the case of the tape printing apparatus 2 that can perform full cut and half cut (when the printing tape T has a double structure of a peeling paper layer and a printing layer, a method of cutting only one of the layers), the full cut or the half cut may be designated according to the type of the predetermined movement or the size of movement.

In the example explained in the embodiment, the portable terminal 1 and the tape printing apparatus 2 are connected via the wireless LAN router 4. However, the portable terminal 1 and the tape printing apparatus 2 may be directly connected. In this case, the portable terminal 1 and the tape printing apparatus 2 may be either connected by wire or wireless. For example, in the case of the wireless connection, a communication system may be any type such as infrared communication or Bluetooth (registered trademark) communication.

The components in the portable terminal 1 or the tape printing apparatus 2 of the printing system SY explained above can be provided as a computer program. The computer program can be provided while being stored in various recording media (a CD-ROM, a flash memory, etc.). In other words, a computer program for causing a computer to function as the components of the portable terminal 1 or the tape printing apparatus 2 and a recording medium having the computer program recorded therein are also included in the scope of right of the invention.

In the embodiment, the tape printing apparatus 2 is explained as an example of a printing apparatus. However, the invention is also applicable to a printing apparatus that can perform printing on strip-like media such as a copy sheet and a postcard (a printing apparatus not including a cutting function). Besides, changes are possible as appropriate without departing from the spirit of the invention.

What is claimed is:

1. A portable terminal for transmitting printing data to a printing apparatus, the portable terminal comprising:
    a printing-data generating unit for generating the printing data;
    a display unit for displaying an editing screen for editing the printing data and a preview display screen for previewing the printing data after editing the printing data on the editing screen;
    a detecting unit for detecting movement of a main body of the portable terminal; and
    a printing-data transmitting unit for transmitting the printing data to the printing apparatus that transmits the printing data to the printing apparatus when at least one of:
        movement is detected by the detecting unit after the printing data generation, and
        a print button is selected after the printing data generation,
    wherein
        the printing-data transmitting unit transmits the printing data to the printing apparatus in response to the detecting unit detecting the movement while the preview display screen is displayed, and
        the printing-data transmitting unit does not transmit the printing data to the printing apparatus in response to the detecting unit detecting the movement while the editing screen is displayed.

2. The portable terminal according to claim 1, further comprising a display control unit for switching the editing screen to the preview display screen when the movement is detected by the detecting unit in the state in which the editing screen is displayed.

3. The portable terminal according to claim 1, further comprising a printing-stop requesting unit for transmitting a printing stop command to the printing apparatus when the movement is detected by the detecting unit within a predetermined time after the transmission of the printing data.

4. The portable terminal according to claim 1, wherein the detecting unit is configured to detect the movement on the basis of a detection result of at least one of an acceleration sensor and an angular velocity sensor.

5. A printing system comprising:
    the portable terminal according to claim 1; and
    a printing apparatus that performs printing on the basis of the printing data.

6. A control method for a portable terminal that transmits printing data to a printing apparatus, the control method comprising:
(a) generating printing data;
(b) displaying an editing screen for editing the printing data;
(c) displaying a preview display screen for previewing the printing data after editing the printing data on the editing screen;
(d) detecting movement of a main body of the portable terminal; and
(e) transmitting the printing data to the printing apparatus when at least one of:
movement is detected in the detecting of movement after the generation of printing data, and
a print button is selected after the printing data generation
wherein
the printing data is transmitted to the printing apparatus when the movement is detected in the detecting of the movement while the preview display screen is displayed, and
the printing data is not transmitted to the printing apparatus when the movement is detected in the detecting of the movement while the editing screen is displayed.

7. The method according to claim 6, further comprising
(f) switching the editing screen to the preview display screen when the movement is detected in the detecting of the movement in the state in which the editing screen is displayed.

8. The method according to claim 6, further comprising
(f) transmitting a printing stop command to the printing apparatus when the movement is detected in the detecting of the movement within a predetermined time after the transmission of the printing data.

9. A computer program product embodied in at least one non-transitory computer readable medium and comprising computer instructions executable by a computer and causing a computer to execute the control method for the portable terminal according to claim 6.

\* \* \* \* \*